Jan. 8, 1929.
C. RETSCHY
1,698,241
OILING DEVICE FOR CRANK SHAFTS
Filed Jan. 16, 1926
Fig. 1
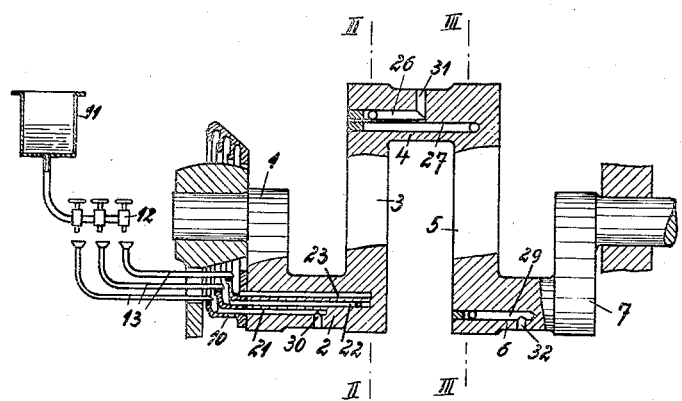
Fig. 2 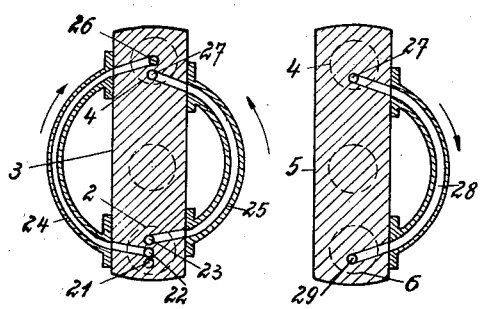 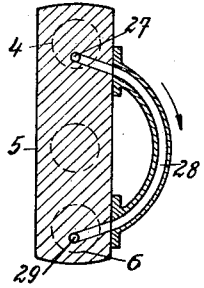 Fig. 3

Patented Jan. 8, 1929.

1,698,241

UNITED STATES PATENT OFFICE.

CURT RETSCHY, OF DESSAU, GERMANY, ASSIGNOR TO HUGO JUNKERS, OF DESSAU, GERMANY.

OILING DEVICE FOR CRANK SHAFTS.

Application filed January 16, 1926, Serial No. 81,801, and in Germany January 24, 1925.

My invention relates to an oiling device for crank shafts having a plurality of crank pins, and more particularly to means whereby the oil is introduced into the shaft on a certain point and is led from that point through channels to the crank pins, the said channels leading to the crank pins remote from the point of introduction over the intermediate crank pins.

For lubrication without pressure it is known in such devices to use oil rings, each fastened to a crank and catching up with its groove open at the inner circumference part of the oil splashed in the crank case, said oil being fed by centrifugal force to the pin of the respective crank. This arrangement of oil rings on each crank is rather complicated, but it cannot give a reliable lubrication, there being no possibility of controlling the quantity fed to each pin.

In such devices it is further known to feed the oil with pressure into a bearing of the shaft, from where it runs into the shaft itself, but this is not applicable for instance in crank shafts running in roller or ball bearings. Also difficulties arise if a crank intermediate the point of oil introduction and the crank pin to be lubricated has a greater radius than the latter crank, as it is the case in three throw crank shafts of double piston engines with unequal strokes of the two pistons, since in such cases the centrifugal force in the oil is generally a maximum in the crank with the greatest radius and prevents the oil from further flowing to a crank of smaller radius.

According to my present invention the oil is fed into the crank shaft at a determined place for instance at one end of it and is led through several cranks of different radii with or without pressure in such a way, that in the oil channel from its beginning all its further points have at least essentially the same distances from the axis of rotation as any preceding point. Hereby a very simple and effective lubrication of several cranks is obtained.

A common channel may be used for feeding oil to several crank pins, but with special advantages I arrange a separate channel for each single crank pin.

In the drawings, forming part of this specification, an embodiment of my invention is illustrated.

Fig. 1 shows a three throw crank shaft in a lateral view, partly in section.

Fig. 2 shows a cross section through a crank web, indicated by line II—II in Fig. 1.

Fig. 3 shows a cross section through another crank web, indicated by line III—III in Fig. 1.

The drawing which is largely schematic in character shows a crank shaft having three crank pins 2, 4, 6 which are connected with each other and with the main journals by crank webs 1, 3, 5, 7. The middle crank pin 4 has a greater distance from the axis of rotation than the two other pins 2 and 6.

The lubrication of the crank pins is effected by the following means: On the crank web 1 a splash ring 10 with three grooves is fastened which receive oil from a store case 11 by means of a distributor device 12 and the pipes 13. The outer groove renders the received oil directly to the boring 21 of the first crank pin 2 whence it flows through branch 30 to the gliding surface of the crank pin bearing. The two other grooves communicate by separate borings 22, 23 with bow shaped channels 24 and 25 attached to the sides of the crank web 3, as to be seen from Fig. 2, these channels guiding the oil without loss of centrifugal force to the borings 26 and 27 in the middle crank pin 4 which is provided with oil from out the channel 24 and the boring 26 by means of a branch 31. The oil running through channel 25 and boring 27 is led to a further bow shaped channel 28 attached to the crank web 5 (Fig. 3) and from there through the boring 29 and branch 32 to the gliding surface of the last crank pin 6.

The delivery of oil over the longer middle crank to the shorter last crank, remote from the point of oil introduction into the shaft, is made possible, notwithstanding the circumstance that the supply of oil to the crank shaft takes place without putting the oil under pressure, on account of the fact that, as shown in the drawing, the boring 27 in the middle crank pin 4 is arranged as nearly to the axis of rotation as possible, whilst the boring 29 in the following crank pin 6 has a distance from said axis as great as possible; thus the oil in its way from the longer crank to the shorter one has not to undergo a diminution of its centrifugal force. In the case of pressureless oil introduction the bow channels 24, 25, 28 may also be shaped as grooves open at their inner circumference.

It may be understood, that the scope of this invention is not limited to this specific example which I have selected for describing and illustrating my invention, but it embraces all variations and modifications thereof which are within the scope of the concluding claims and which will be obvious to those skilled in the art to which my invention relates.

I claim:

1. In an oiling device for crank shafts having cranks with different radii in combination: means for feeding lubricating oil, a conduit provided on the crank shaft so as to receive oil from said means, and leading from said means through several pins of cranks with different radii to the place of oil consumption no part of said conduit being materially closer to the axis of rotation than any preceding part.

2. In an oiling device for crank shafts having cranks with different radii in combination: means for feeding lubricating oil, a conduit provided on the crank shaft so as to receive oil from said means, and leading from said means through the pin of a crank with greater radius eccentrically to the crank pin and nearer to the axis of rotation, and through a following pin of a crank with smaller radius eccentrically to the crank pin but remote from the axis of rotation.

3. In an oiling device for crank shafts having cranks with different radii in combination: a splash ring on the crank shaft, and a conduit provided on the crank shaft so as to receive oil from said splash ring, and leading from said splash ring through several crank pins no part of said conduit being materially closer to the axis of rotation than any preceding part.

4. In an oiling device for crank shafts having cranks with different radii in combination: means for feeding lubricating oil to an axial channel in a crank pin of the crank shaft, and bow shaped conduits connecting axial channels in the other crank pins so that said channels and conduits form a continuous conduit, in a pin of a crank with greater radius, a channel lying eccentrically to the crank pin and nearer to the axis of rotation, and a channel in a following pin of a crank with smaller radius lying eccentrically to the crank pin but remote from the axis of rotation.

5. In an oiling device for crank shafts having cranks with different radii in combination: means for feeding lubricating oil, and separate conduits provided on the crank shaft so as to receive oil from said means, one of said conduits running through the pin of a longer crank eccentrically and nearer to the axis of rotation, and ending in the pin of a shorter crank eccentrically and remote from the axis of rotation.

6. In an oiling device for crank shafts having cranks with different radii in combination: separate splash rings, and separate conduits provided on the crank shaft so as to receive oil each from one of said respective splash rings, one of said conduits running through the pin of a greater crank eccentrically and nearer to the axis of rotation, and ending in the pin of a shorter crank eccentrically and remote from the axis of rotation.

7. In an oiling device for crank shafts having cranks with different radii in combination: means for feeding oil in separate controllable quantities, separate splash rings for receiving the oil quantities from said means, and separate conduits provided on the crank shaft so as to receive oil each, from one of said respective splash rings, one of said conduits running through the pin of a greater crank eccentrically and nearer to the axis of rotation, and ending in the pin of a shorter crank eccentrically and remote from the axis of rotation.

8. In an oiling device for crank shafts having three cranks, the middle of which has a greater radius than the two outer cranks, in combination: means for feeding lubricating oil, arranged near one outer crank, and a separate conduit for each crank, provided so as to receive oil from said feeding means and leading to the appertaining crank pin through the preceding pins, the conduit feeding the other outer crank pin running through the middle crank pin eccentrically and nearer to the axis of rotation, and ending in the said outer crank pin eccentrically but remote from the axis of rotation.

9. In an oiling device for crank shafts having three cranks, the middle of which has a greater radius than the two outer cranks, in combination: means for feeding lubricating oil, arranged near one outer crank, a splash ring arrangement having three grooves for receiving oil from said means, and three conduits, each communicating with one of said grooves and leading to one of the crank pins through the preceding pins, the conduit feeding the other outer crank pin running through the middle crank pin eccentrically and nearer to the axis of rotation, and ending in the said outer crank pin eccentrically but remote from the axis of rotation.

In testimony whereof I affix my signature.

CURT RETSCHY.